May 5, 1970  D. M. MAKOW  3,510,859
DISPLACEMENT MEASURING DEVICE

Filed June 5, 1967  3 Sheets-Sheet 1

INVENTOR
DAVID M. MAKOW
BY
AGENT

May 5, 1970  D. M. MAKOW  3,510,859
DISPLACEMENT MEASURING DEVICE
Filed June 5, 1967  3 Sheets-Sheet 2

INVENTOR
DAVID M. MAKOW
BY
AGENT

May 5, 1970   D. M. MAKOW   3,510,859
DISPLACEMENT MEASURING DEVICE
Filed June 5, 1967   3 Sheets-Sheet 3

INVENTOR
DAVID M. MAKOW
By [signature]
AGENT

United States Patent Office 3,510,859
Patented May 5, 1970

3,510,859
DISPLACEMENT MEASURING DEVICE
David M. Makow, Ottawa, Ontario, Canada, assignor to Canadian Patents and Development Limited, Ottawa, Ontario, Canada, a corporation of Canada
Filed June 5, 1967, Ser. No. 643,630
Int. Cl. G08c 19/10
U.S. Cl. 340—200                                    2 Claims

ABSTRACT OF THE DISCLOSURE

A length measuring device consisting of four parallel rods whose center-lines lie on the corners of a square. A first pair of adjacent rods have formed on their surfaces, a series of equal length cylindrical capacitive elements isolated from each other electrically and which are connected to a source of linearly stepped voltage levels. The other pair of rods which are moveable in relation to the first pair of rods have pick-up capacitive elements formed on their surfaces which pick-up a voltage whose level is directly related to the position of the pick-up elements in relation to the capacitive elements on the first pair of rods. The apparatus incorporates a comparing circuit to provide the necessary output reading and which is adapted to take a first reading employing a first pair of diagonally positioned rods and a second reading using the other pair of diagonally positioned rods. The mean value of the two readings gives a very precise reading of displacement.

Figure 1:
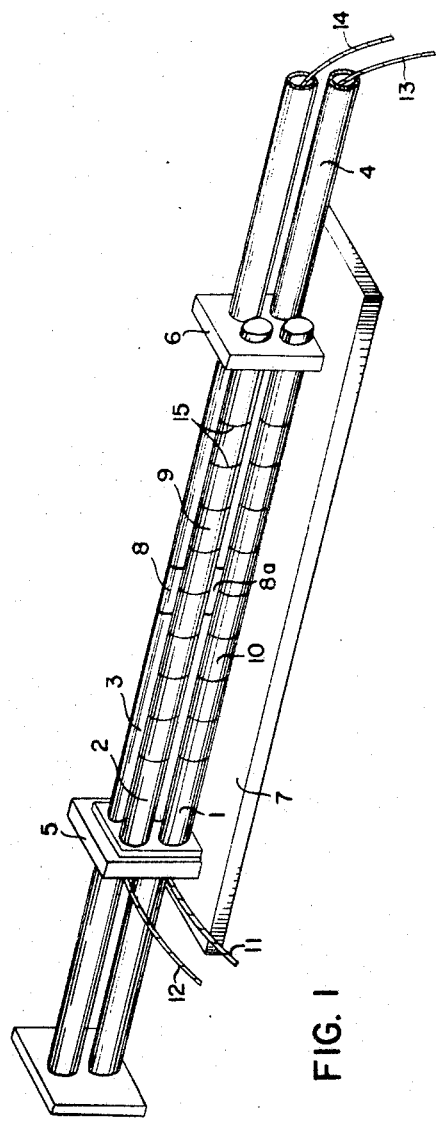

This invention relates to a displacement measuring device and more particularly to a capacitive potentiometer device for determining the distance or displacement a member has moved in relation to another member.

Capacitive potentiometers are known for determining the position of a member along a track or for positioning a member along a track. Apparatus of this type is disclosed in U.S. Pat. No. 3,071,758 issued Jan. 1, 1963 to C. F. Wolfendale. In this patent the pick-up electrode is a relatively short metal cylinder slidably mounted in coaxial relation with a longer cylinder formed of a series of cylindrical capacitive elements electrically isolated from each other. The pick-up electrode is not in direct contact with the capacitive elements on the central cylinder but assumes an electrical potential through the capacitive effect between it and the elements. Because mutually different electrical potentials are applied to the said elements, differing potentials appear on the pick-up electrode depending on its position along the length of the central cylinder. In practice, the voltages applied to the series of capacitive elements are arranged in successively higher equal steps along the length of the central cylinder with the result that a linear output voltage function will be obtained on the pick-up electrode directly proportional to its position or distance moved along the central cylinder.

Theoretically, the apparatus described above should operate with precision and accuracy to a high degree. However, fabrication of the device in practice results in errors in precision and departure from true linearity. The first of these occurs because of the difficulty in maintaining the pick-up element in correct coaxial relation with the central member along the extent of travel of the pick-up. The pick-up element is short in relation to the center rod and also because the insulating layers usually interposed between the pick-up and the central rod is subject to wear, a wobbling effect may be obtained. In addition, because of the need for electrical isolation between the capacitive elements, a discontinuity effect results as the pick-up passes from one element to the next.

In a paper entitled "A New Theorem in Electrostatics and Its Application to Calculable Standards of Capacitance," published in Nature, vol. 177, p. 888, May 12, 1956. A. M. Thompson and D. G. Lampard showed that four parallel cylinders form a precise capacitor with useful characteristics. The mean value of the cross-capacitance between opposite cylinders is invariant to the first order with cross-sectional dimensions such as cylinder spacing and diameter and is only a function of length.

It is an object of the present invention to provide a displacement measuring device of the capacitive potentiometer type wherein accuracy and linearity are greatly improved.

It is another object of the invention to provide a measuring device that can be readily adapted to precisely measure the displacement of points that are relatively far apart.

It is another object of the invention to provide a measuring device constructed and operable in such a manner as to take advantage of the Thompson-Lampard Theorem mentioned above.

These and other objects of the invention are achieved by providing a measuring device comprising a first pair of similar parallel extended structures in fixed relation to each other, said structures having formed on their surfaces a series of equal length cylindrical capacitive elements electrically isolated from each other, means for applying successively greater voltage levels to the capacitive elements of each structure along its length such that a capacitive element on one structure has a similar voltage level to the corresponding capacitive element on the other structure, a second pair of similar parallel structures in fixed relation to each other and slidably mounted in parallel relation to the said first pair of structures such that the axes of the four structures lie at the corners of a square, said second pair of structures each having formed on its surface a cylindrical pick-up element of equal or longer length to the capacitive elements on the first pair of similar parallel structures, electrical connections from said pick-up elements to a voltage comparing circuit giving an output indication related to the position of the second pair of structures in relation to the first pair of structures. In the preferred form of the invention the extended structures would be cylindrical rods.

Figure 2:
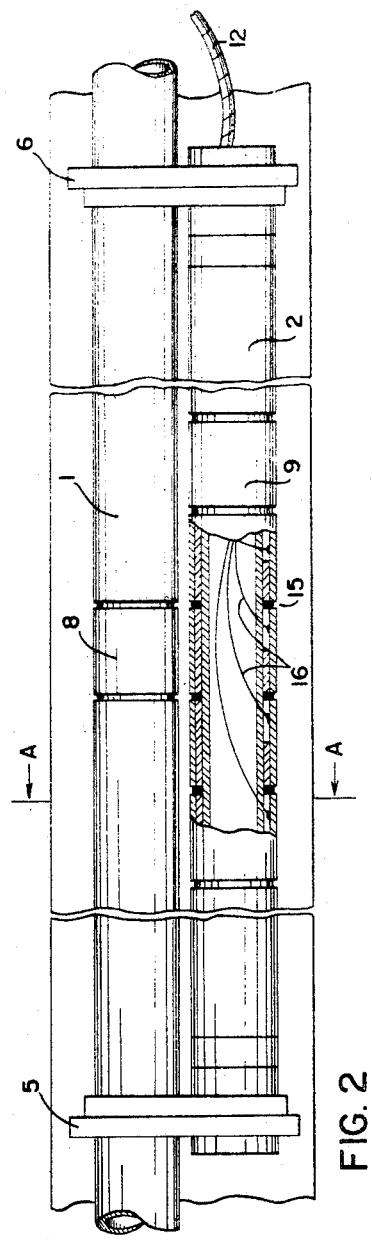
Figure 3:
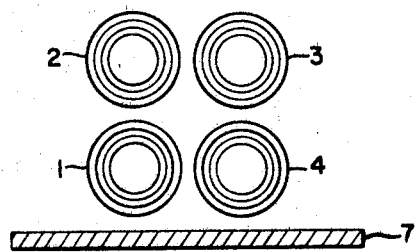
Figure 4:
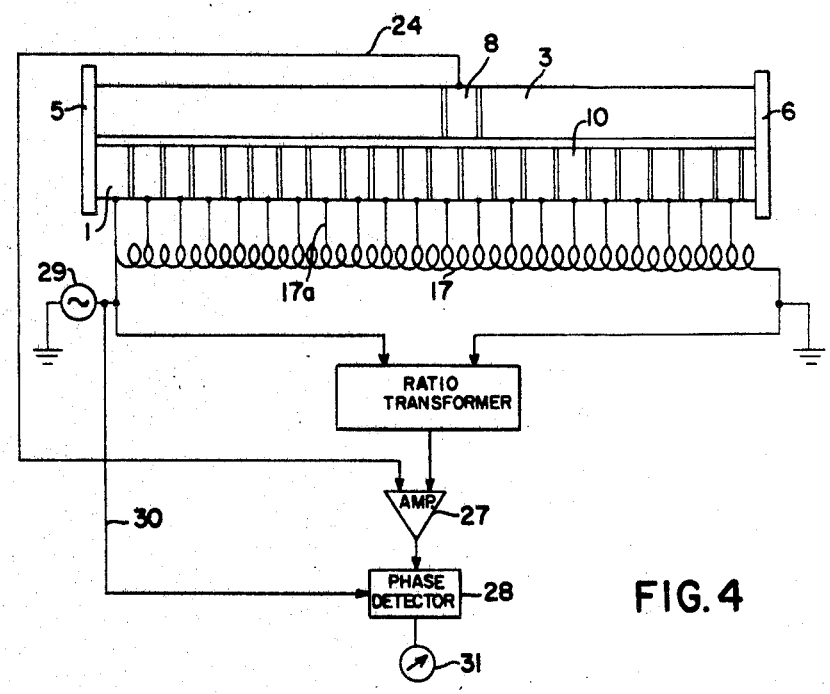
Figure 5:
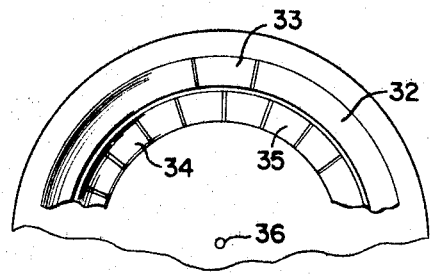
Figure 6:
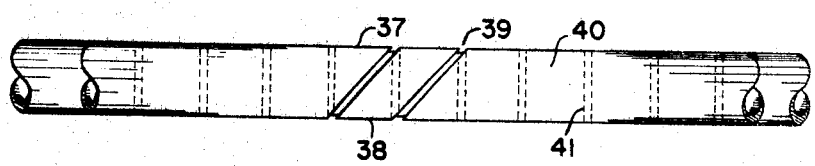

In drawings which illustrate embodiments of the invention,

FIG. 1 is a three-quarter view of the measuring portion of the device showing pick-up elements in relation to the series of capacitive elements, FIG. 2 is a plan view partly in section of the device shown in FIG. 1, FIG. 3 is a cross-section of the device shown in FIG. 2 taken on the line A—A, FIG. 4 is a circuit diagram in schematic form of voltage dividing and measuring circuitry that may be used with the device, FIG. 5 is a plan view of a circular version of the invention for measuring angular displacement, and FIG. 6 shows a modified form of the pick-up device and capacitive elements.

Referring to FIG. 1, two similar parallel structures in the form of cylindrical rods 1 and 2 are positioned in fixed parallel relation to each other by means of end plates 5 and 6 mounted on a frame or bed-piece 7. Rods 1 and 2 are positioned relatively close to each other but with sufficient air gap between to provide electrical isolation. On the surface of the rods are formed a series of short cylindrical capacitive elements 9 and 10. Gaps 15 are left between neighbouring elements to provide electrical isolation. A second pair of cylindrical rods 3 and 4 are slidably mounted in end plates 5 and 6 with sufficient extension at each end to allow travel of pick-up elements 8 and 8a from a position at one of the series of capacitive elements 9 and 10 to the other. In an actual operating device it might be found inconvenient to have rods 3 and 4 extending outwardly at each end. Pick-up elements 8 and 8a could be connected to a measuring arm and slide on 9 and 10 with insulating spacers between. Any wear of the spacers would not affect linearity. Capacitive elements 8 and 8a are exactly equal or longer in length to capacitive elements 9 and 10 and are electrically isolated from the main body portions of rods 3 and 4. Slidable rods 3 and 4 are ganged or connected together so that they travel back and forward in the end plates as a unit. Electrical leads 11 and 12 pass into rods 1 and 2 to provide the necessary stepped voltages to the series of capacitive elements 9 and 10. Electrical leads 13 and 14 pass into the ends of tubes 4 and 3 to make electrical contact with pick-up elements 8 and 8a.

Referring to FIG. 2, a preferred method of making the necessary electrical contacts 16 to the series of capacitive elements 9 and 10 (hidden) is shown and also the method of forming the insulating gap 15 between elements. The cylindrical tubes forming the rods may be made of copper, steel, or brass. The insulators can be rubber or plastic. An alternative method of forming the rods is by vacuum deposition of metallic vapor on to the surface of quartz or glass rods. This latter method provides rods that are less affected by thermal expansion. In addition, the insulating gaps or slots 15 can be readily produced by masking techniques.

FIG. 3 shows a cross-section of FIG. 2 taken on the line A—A. It will be seen that the axes of the four rods 1, 2, 3, 4 lie on the corners of a square. In an actual operating device a shielding container would be built around the rods to minimize the effect of stray electric fields on the measurement.

Referring to FIG. 4 an electrical measuring circuit is shown that can be used with the device. A coil 17 energized by an A.C. source 29 has equally spaced tops 17a which provide a series of equally stepped voltage levels to capacitive elements 10. The voltage picked up by pick-up electrode 8 via line 24 and a balancing voltage from precision ratio transformer 18 is applied to a detector circuit made up of amplifier 27, phase detector 28 and meter 31. A reference signal is applied to phase detector 28 via line 30.

In operation, to measure the position of electrode 8 and rod 3 in relation to rod 1, the ratio transformer is adjusted until a null reading is obtained (balancing what is essentially a bridge). The reading obtained is directly related to the position of the movable electrode. After a first reading is obtained using rods 1 and 3 a second reading is obtained using rods 2 and 4 (refer to FIGS. 1 and 3). The mean value of the two readings is not only invariant to the first order with cross-sectional diversion of the parallel rods but is also a precise linear function of pick-up electrode displacement. Invariance to the first order means that if the error of parallel alignment or in the cylindrical shape of the rods is $10^{-3}$, the error in capacitance measurement is proportional not to $10^{-3}$ but to $(10^{-3})^2$ or $10^{-6}$. Reference should be made to the Thompson-Lampard Theorem described above.

FIG. 4 shows the bridge circuitry connected to the appropriate electrodes on rods 1 and 3. It will be appreciated that similar connections are necessary to rods 2 and 4 to achieve the necessary two readings. There would be a duplicate bridge circuit attached to the appropriate electrodes on these rods or more conveniently a switching arrangement in the leads so that the measuring circuitry could be switched from one set of rods to the other as required.

FIG. 5 shows a possible set-up for measuring angular displacement. Annular rod 34 having a series of electrodes 35 similar to the straight line devices described above is fixed in position on center 36. A relatively rotatable rod 32 having a pick-up electrode 33 is adapted to rotate on center 36. It should be pointed out that it might be more convenient to form the rods with square cross-sections or even in sectional form as these might be simpler to build. The principle and mode of operation, however, would be the same. A second set of similar rods (not shown) would be mounted such as to give the necessary cross capacitance readings, i.e., at any cross-section the axes of the four rods would be at the corners of a square.

FIG. 6 shows a modification in the form of the pick-up electrode of FIGS. 1 and 2. In this case the electrode 38 in movable rod 37 is slanted such that it extends over two or more of the electrodes 40 or the fixed rod 42 as shown. It should be pointed out that rods 37 and 42 are comparable to either rods 1 and 3 or to 2 and 4 of FIG. 1. Because of the necessity of having isolating gaps between electrodes, the device with a non-slanted pick-up electrode suffers from the problem of non true linearity, i.e., there would be departures from the theoretical straight line voltage function that might be obtained. The slanting of the electrode minimizes this effect to a considerable degree.

What is claimed is:
1. A displacement measuring device comprising:
   (a) a first pair of similar parallel extended structures in fixed relation to each other,
   (b) said structures having formed on their surfaces a series of equal length capacitive elements electrically isolated from each other,
   (c) means for applying successively greater voltage levels to the capacitive elements of each structure along its length such that a capacitive element on one structure has a similar voltage level to the corresponding capacitive element on the other structure,
   (d) a second pair of similar parallel structures in fixed relation to each other and slidably mounted in parallel relation to the said first pair of structures such that the axes of the four structures lie substantially at the corners of a square,
   (e) said second pair of structures each having formed on its surface a pick-up element of at least equal length to the capacitive elements on the first pair of similar parallel structures,
   (f) a voltage comparing circuit, and
   (g) electrical connections from said capacitive elements to said voltage comparing circuit,
   (h) said voltage comparing circuit adapted such as to give an output indication related to the position of the second pair of structures in relation to the first pair of structures.
2. A displacement measuring device as in claim 1 wherein the similar parallel structures are cylindrical rods.

References Cited
UNITED STATES PATENTS

| 2,592,770 | 4/1952 | Waldie | 340—200 |
| 3,071,758 | 1/1963 | Wolfendale | 340—200 |
| 3,348,133 | 10/1967 | Wolfendale | 340—200 |
| 3,384,883 | 5/1968 | Wolfendale | 340—200 |

THOMAS B. HABECKER, Primary Examiner

U.S. Cl. X.R.
317—249